US012667775B2

(12) United States Patent (10) Patent No.: US 12,667,775 B2
Choi et al. (45) Date of Patent: Jun. 30, 2026

(54) ELECTRONIC DEVICE AND METHOD

(71) Applicant: SAMSUNG ELECTRONICS CO., LTD., Suwon-si (KR)

(72) Inventors: Juhyun Choi, Suwon-si (KR); Sungjoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 252 days.

(21) Appl. No.: 18/647,978

(22) Filed: Apr. 26, 2024

(65) Prior Publication Data

US 2024/0293737 A1 Sep. 5, 2024

Related U.S. Application Data

(63) Continuation of application No. PCT/KR2022/021609, filed on Dec. 29, 2022.

(30) Foreign Application Priority Data

Jan. 12, 2022 (KR) ........................ 10-2022-0004741

(51) Int. Cl.
| | |
|---|---|
| A63F 13/355 | (2014.01) |
| A63F 13/23 | (2014.01) |
| A63F 13/35 | (2014.01) |
| A63F 13/352 | (2014.01) |
| A63F 13/358 | (2014.01) |
| A63F 13/40 | (2014.01) |
| A63F 13/73 | (2014.01) |

(Continued)

(52) U.S. Cl.
CPC ............ *A63F 13/355* (2014.09); *A63F 13/23* (2014.09); *A63F 13/35* (2014.09); *A63F 13/352* (2014.09); *A63F 13/358* (2014.09);

*A63F 13/40* (2014.09); *A63F 13/73* (2014.09); *A63F 13/77* (2014.09); *A63F 13/79* (2014.09)

(58) Field of Classification Search
CPC ........ A63F 13/23; A63F 13/35; A63F 13/352; A63F 13/355; A63F 13/358; A63F 13/40; A63F 13/73; A63F 13/77; A63F 13/79
See application file for complete search history.

(56) References Cited

U.S. PATENT DOCUMENTS 8,876,609 B2 * 11/2014 Park ........................ A63F 13/30
463/40
9,055,066 B2 6/2015 Kim et al.
(Continued)

FOREIGN PATENT DOCUMENTS

CN 109126122 A 1/2019
EP 3893466 10/2021
(Continued)

OTHER PUBLICATIONS

International Search Report for PCT/KR2022/021609 mailed Mar. 30, 2023, 5 pages.
(Continued)

*Primary Examiner* — William H Mcculloch, Jr.
(74) *Attorney, Agent, or Firm* — Nixon & Vanderhye, P.C.

(57) ABSTRACT

Various embodiments of the present disclosure provide an electronic device for minimizing and/or reducing a delay occurring in transmitting a game command input to a game server by separating a process dedicated to inputting a game command, in a cloud game environment.

20 Claims, 14 Drawing Sheets

(51) Int. Cl.
*A63F 13/77* (2014.01)
*A63F 13/79* (2014.01)

(56) References Cited

U.S. PATENT DOCUMENTS

| | | | |
|---|---|---|---|
| 9,072,972 B2* | 7/2015 | Ahiska | H04L 67/5682 |
| 9,381,432 B2* | 7/2016 | Justice | A63F 13/355 |
| 9,400,548 B2* | 7/2016 | Zhang | A63F 13/213 |
| 9,795,879 B2* | 10/2017 | Colenbrander | A63F 13/79 |
| 9,898,434 B2 | 2/2018 | Murakami | |
| 10,744,407 B2* | 8/2020 | Colenbrander | A63F 13/95 |
| 10,898,812 B2 | 1/2021 | Zimring et al. | |
| 11,167,212 B1 | 11/2021 | Buliani et al. | |
| 11,331,586 B2* | 5/2022 | Fear | H04N 21/84 |
| 11,648,481 B2* | 5/2023 | Yerva | A63F 13/77 |
| | | | 463/31 |
| 11,684,849 B2* | 6/2023 | Buser | A63F 13/355 |
| | | | 463/42 |
| 12,070,680 B2* | 8/2024 | Perry | A63F 13/358 |
| 12,383,838 B2* | 8/2025 | Yerva | A63F 13/77 |
| 12,403,405 B2* | 9/2025 | Dan | A63F 13/352 |
| 2012/0278439 A1* | 11/2012 | Ahiska | A63F 13/77 |
| | | | 709/218 |
| 2015/0087414 A1* | 3/2015 | Chen | A63F 13/355 |
| | | | 463/31 |
| 2017/0065887 A1* | 3/2017 | Colenbrander | A63F 13/355 |
| 2019/0270019 A1 | 9/2019 | Miura et al. | |
| 2021/0052988 A1* | 2/2021 | Fear | H04N 21/25875 |
| 2021/0339130 A1 | 11/2021 | Sameer Kalathil | |
| 2022/0001279 A1 | 1/2022 | Colenbrander | |
| 2022/0118363 A1* | 4/2022 | Yerva | A63F 13/77 |
| 2024/0024785 A1* | 1/2024 | Dan | A63F 13/352 |
| 2024/0293737 A1* | 9/2024 | Choi | A63F 13/77 |
| 2024/0390789 A1* | 11/2024 | Mo | A63F 13/355 |

FOREIGN PATENT DOCUMENTS

| | | |
|---|---|---|
| JP | 6428309 B2 | 11/2018 |
| JP | 2020501619 A | 1/2020 |
| JP | 2021094086 A | 6/2021 |
| KR | 101312268 B1 | 9/2013 |
| KR | 101430930 B1 | 9/2014 |
| KR | 20150089624 A | 8/2015 |
| KR | 20190033022 A | 3/2019 |
| KR | 20200090256 A | 7/2020 |
| KR | 20200135866 A | 12/2020 |
| KR | 20210047197 A | 4/2021 |
| WO | 2017218136 A1 | 12/2017 |
| WO | 2019194953 A1 | 10/2019 |
| WO | 2019195167 A2 | 10/2019 |

OTHER PUBLICATIONS

Written Opinion of the ISA for PCT/KR2022/021609 mailed Mar. 30, 2023, 3 pages.
Extended European Search Report dated Feb. 19, 2025 issued in European Patent Application No. 22920843.4.

\* cited by examiner

FIG.5

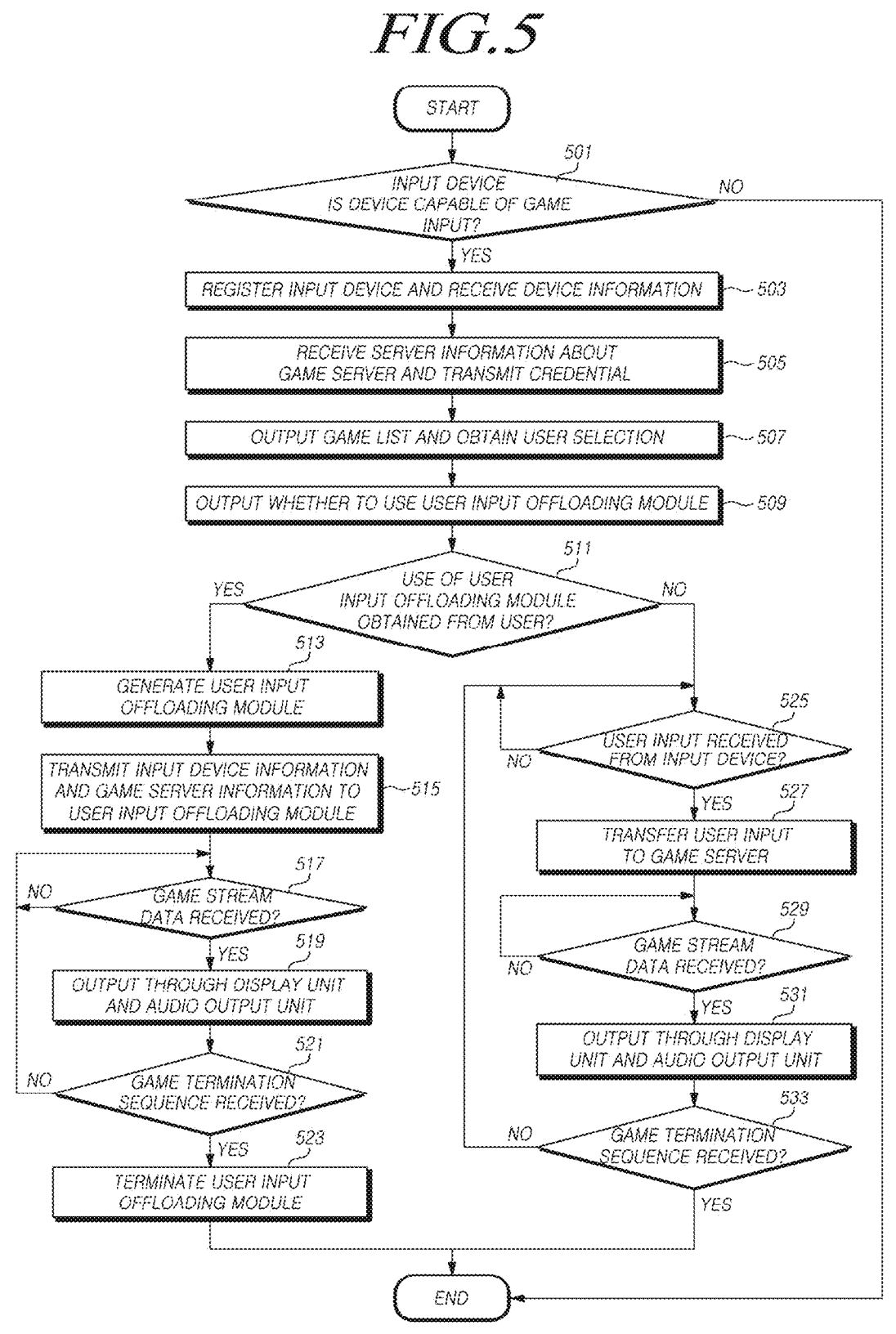

START

501 — INPUT DEVICE IS DEVICE CAPABLE OF GAME INPUT? —— NO

↓ YES

REGISTER INPUT DEVICE AND RECEIVE DEVICE INFORMATION —— 503

RECEIVE SERVER INFORMATION ABOUT GAME SERVER AND TRANSMIT CREDENTIAL —— 505

OUTPUT GAME LIST AND OBTAIN USER SELECTION —— 507

OUTPUT WHETHER TO USE USER INPUT OFFLOADING MODULE —— 509

511 — USE OF USER INPUT OFFLOADING MODULE OBTAINED FROM USER?

YES ↓          NO →

513 — GENERATE USER INPUT OFFLOADING MODULE

TRANSMIT INPUT DEVICE INFORMATION AND GAME SERVER INFORMATION TO USER INPUT OFFLOADING MODULE —— 515

517 — GAME STREAM DATA RECEIVED? — NO

↓ YES  519

OUTPUT THROUGH DISPLAY UNIT AND AUDIO OUTPUT UNIT

521 — GAME TERMINATION SEQUENCE RECEIVED? — NO

↓ YES  523

TERMINATE USER INPUT OFFLOADING MODULE

525 — USER INPUT RECEIVED FROM INPUT DEVICE? — NO

↓ YES  527

TRANSFER USER INPUT TO GAME SERVER

529 — GAME STREAM DATA RECEIVED? — NO

↓ YES  531

OUTPUT THROUGH DISPLAY UNIT AND AUDIO OUTPUT UNIT

533 — GAME TERMINATION SEQUENCE RECEIVED? — NO

↓ YES

END

*FIG.12*

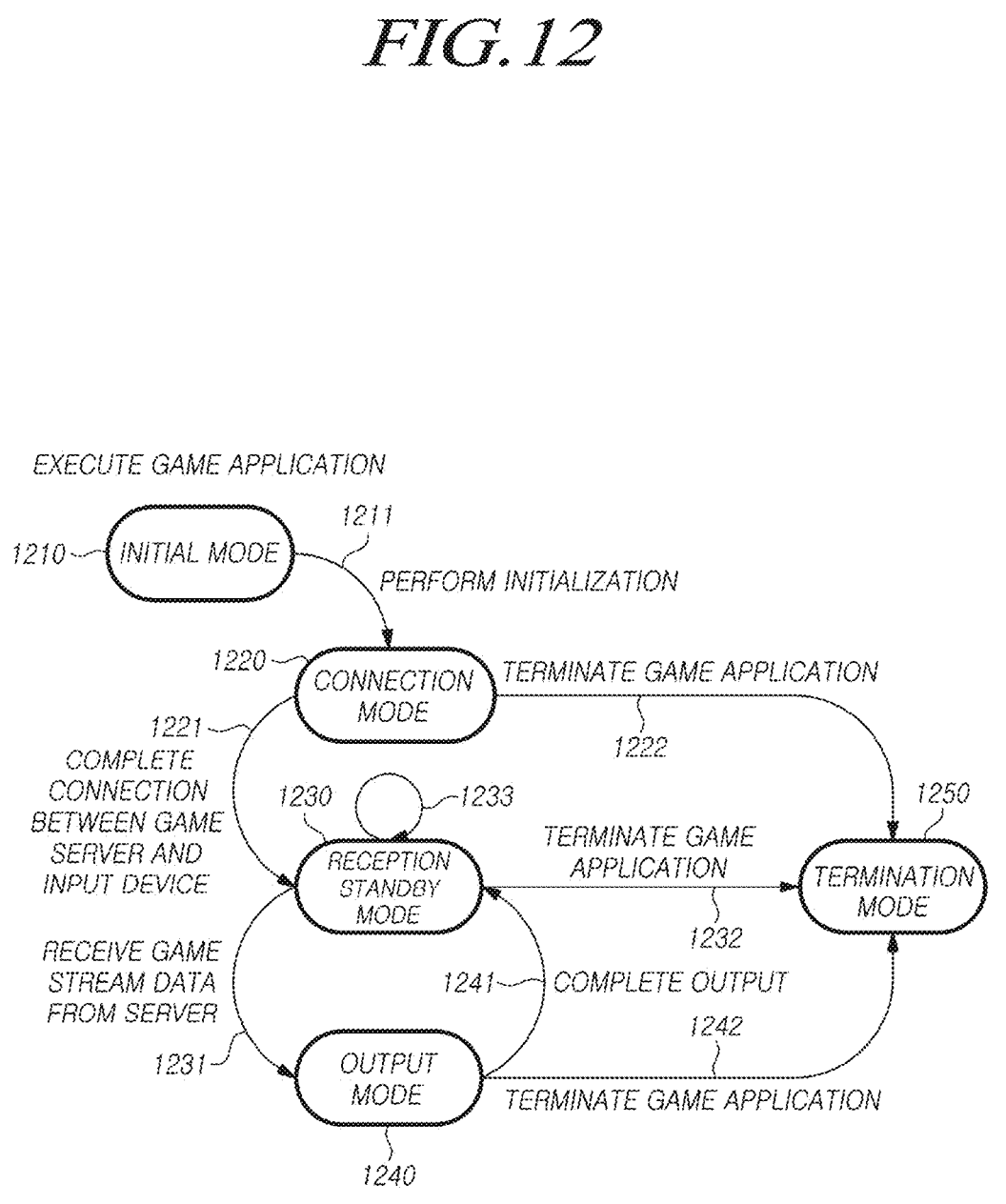

EXECUTE GAME APPLICATION

1210 — INITIAL MODE

1211

PERFORM INITIALIZATION

1220 — CONNECTION MODE

TERMINATE GAME APPLICATION

1222

1221 —
COMPLETE
CONNECTION
BETWEEN GAME
SERVER AND
INPUT DEVICE 1230          1233

1250

TERMINATE GAME
APPLICATION

1232

RECEPTION
STANDBY
MODE

TERMINATION
MODE

RECEIVE GAME
STREAM DATA
FROM SERVER

1241 — COMPLETE OUTPUT

1242

1231 — OUTPUT
MODE

TERMINATE GAME APPLICATION

1240

ELECTRONIC DEVICE AND METHOD

CROSS-REFERENCE TO RELATED APPLICATIONS

This application is a continuation of International Application No. PCT/KR2022/021609 designating the United States, filed on Dec. 29, 2022, in the Korean Intellectual Property Receiving Office and claiming priority to Korean Patent Application No. 10-2022-0004741, filed on Jan. 12, 2022, in the Korean Intellectual Property Office, the disclosures of each of which are incorporated by reference herein in their entireties.

BACKGROUND

Field

The disclosure relates to an electronic device and method for interactive video games.

Description of Related Art

Cloud gaming is a gaming service that installs and runs games on a cloud server and plays them on display devices, such as smartphones, TVs, and PCs using real-time streaming. Users who play cloud games connect a game controller or gamepad to the display device and play the game using in a manner of transferring input signals in real-time to the screen played on the cloud server. The game engine, game data, and nearly all of the resources necessary for playing game are stored in the cloud server, and the user may use the game on a user input device, such as a display device or a gamepad, anytime, anywhere.

In a cloud game environment, a game-related single related process of the electronic device transfers user inputs to the game server, and decodes, renders, and outputs the game image and/or sound stream data received from the game server. In this process, the game-related single process contends with the UI event of the browser engine which is a base framework, input/output processing, file system processing, and network event processing. Further, if one thread of the game-related single process falls into an IO block, all of the threads of the corresponding process may be blocked. Due to such thread contention and bottlenecks, the output of the screen corresponding to the game command entered by the user may be delayed. In particular, the part that transfers user inputs to the game server may aggravate the thread contention and delay the responsiveness of the game due to frequent transmission of small-sized data.

SUMMARY

Embodiments of the disclosure may provide an electronic device and method for enhancing the responsiveness of game by mitigating thread contention in the electronic device and reducing a delay occurring in the step of transferring the user's game command input to the game server.

According to an example embodiment of the disclosure, an electronic device may comprise: a communication unit comprising communication circuitry configured to transmit/receive data to/from a game server or an input device through a network, a display unit comprising a display, an audio output unit comprising audio output circuitry, memory storing at least one program, and at least one processor, comprising processing circuitry, electrically connected to the display unit, the audio output unit, the memory, and/or the communication unit, individually and/or collectively, configured to execute at least one instruction of the program stored in the memory. At least one processor, individually and/or collectively, may be configured to: based on obtaining an event for selecting a game application, execute a game driving module and transfer, by the game driving module, game authentication information requesting a credential to the game server through the communication unit. The game driving module may be configured to: based on recognizing that a game corresponding to the event starting, generate an input offloading module to transfer an input from the input device to the game server through the communication unit and provide delegation information necessary for transferring the input to the game server, to the input offloading module.

According to an example embodiment of the disclosure, a method for providing a game function in an electronic device may comprise: based on obtaining an event for selecting a game application, executing a game driving module, transferring game authentication information requesting a credential to a game server, by the game driving module, based on recognizing that a game corresponding to the event starting, generating an input offloading module, by the game driving module, providing delegation information to the input offloading module, by the game driving module, and transferring an input to the game server using the delegation information, by the input offloading module.

According to an example embodiment of the disclosure, an electronic device may comprise: a communication unit comprising communication circuitry configured to transmit/receive data to/from a server or an input device comprising input circuitry, memory storing at least one program, and at least one processor, comprising processing circuitry, operatively connected with the memory, and/or the communication unit and individually and/or collectively configured to execute at least one instruction of the program stored in the memory. At least one processor, individually and/or collectively, is configured to: obtain, by the driving processor, connection information with the input device and authentication information with the server, transmit, by the driving processor, the connection information and the authentication information to the input offloading process, receive, by the input offloading process, input data from the input device based on the connection information, and transmit, by the input offloading process, the input data to the server based on the authentication information.

According to various example embodiments of the disclosure, a process dedicated to inputting the user's game commands is separated from a game application in an electronic device, thereby eliminating and/or reducing bottlenecks due to execution complexity and thread contention of the game application while enhancing game responsiveness.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 is a flowchart illustrating example operations of a game driving module according to various embodiments;

FIG. 12 is a state transition diagram of a game driving module according to various embodiments.

DETAILED DESCRIPTION

Figure 1:
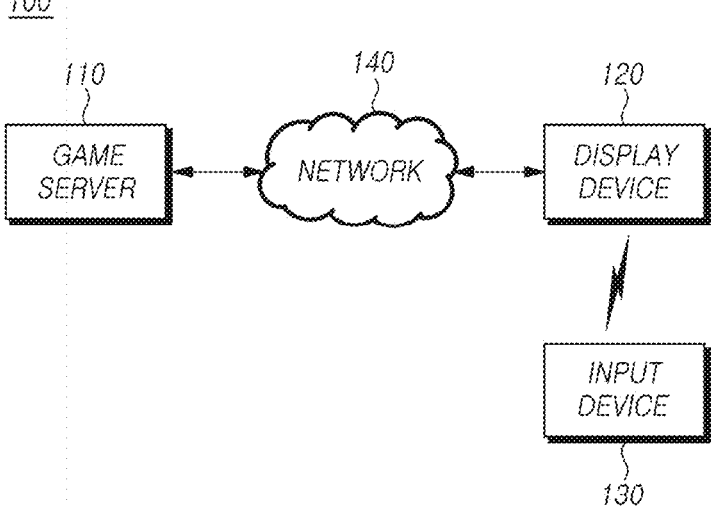
FIG. 1 is a diagram illustrating an example configuration of a cloud game system according to various embodiments.

Hereinafter, various example embodiments of the present disclosure will be described in greater detail with reference to the accompanying drawings. In the following description, an example of the electronic device may be a display device. Various details, such as detailed configurations and components, will be provided merely for a better understanding of embodiments of the disclosure. The same or similar reference denotations may be used to refer to the same or similar elements throughout the disclosure and the drawings. Further, for clarity and brevity, no description may be made of well-known functions and configurations in the drawings and relevant descriptions.

FIG. 1 is a diagram illustrating an example configuration of a cloud game system according to various embodiments.

Referring to FIG. 1, a cloud game system 100 according to an embodiment may include a game server 110, a display device 120, and/or at least one input device 130. The game server 110, the display device 120, or the input device 130 may be connected to each other through a network 140 to communicate with each other.

According to an embodiment, the game server 110 may provide a game service to the display device 120. The game server 110 may provide hardware, software or data necessary to provide a game service to the display device 120. The game server 110 may include a graphic card equipped with a high-performance graphic processing unit (GPU)) to run high-spec games. The game server 110 may execute the game selected by the user, render and compress the game screen corresponding to a game play command input by the user, and stream the same to the display device 120.

According to an embodiment, the game server 110 may manage the user account for the game service. The game server 110 may register and authorize attribute data such as the user account, password, and payment information about the served game, perform configuration according to the user account, and manage the same separately from other user accounts.

According to an embodiment, the game server 110 may store and manage game software and session information for each user account. The game server 110 may store game data for each user account, e.g., game session information such as game points, game items, game levels, and game progress status.

According to an embodiment, the game server 110 may perform a signal adjustment procedure for optimizing the connection state with the display device 120. For example, the game server 110 may change the video quality in the middle of streaming the game image. The game server 110 may select the optimal quality regarding the game screen playback based on the streaming speed, available system resources (e.g., GPU), or communication protocol.

According to an embodiment, the game server 110 may operate as a single server or a plurality of servers. The game server 110 may be present in physically the same server as a streaming server (not shown) or an authentication server (not shown) or may be present as a separate server that may be connected to a mobile communication network.

According to an embodiment, the display device 120 may include a display and include, for example and without limitation, at least one of, a TV, a smartphone, a tablet PC, a laptop PC, a game console, a head mounted display (HMD), a wearable device, etc.

According to an embodiment, the display device 120 may access the game server 110 through the connected network or another network linked to the connected network.

According to an embodiment, the display device 120 may transmit the game play command received from the input device 130 to the game server 110 and receive game stream data corresponding to the game play command. The game stream data may include image data, sound data, and tactile data. The display device 120 may demultiplex and decode and output the game stream data. The user may receive the game screen and the sound reflecting the game play command input through the input device 130, through the display device 120, thereby experiencing as if the game is being executed on the display device 120.

According to an embodiment, the input device 130 may include various circuitry including, for example, and without limitation, at least one of a game pad, a game controller, a virtual reality controller, an augmented reality controller, a joystick, a thumb stick, a mouse, a keyboard, etc.

According to an embodiment, the input device 130 may include at least one of a directional pad such as a keypad, a touchpad, or a trackpad, a trackball, a jog wheel, or an electronic digitizer that has a data transmission function and generates an input signal according to the user's manipulation.

According to an embodiment, the input device 130 may include a virtual controller pad implemented using a touch screen.

According to an embodiment, when the input device 130 does not include a keypad, the display device 120 may provide a virtual keyboard on a screen to enable an input such as a user account input. The user may access the virtual keyboard by manipulating the input device 130.

According to an embodiment, the input device 130 may be connected to the display device 120 through wired or wireless communication.

According to an embodiment, the input device 130 may request the display device 120 to execute the game. When the user selects the game application from the menu of the screen provided by the display device 120, the input device 130 may transmit the content selected by the user to the display device 120.

According to an embodiment, the input device 130 may transmit and receive data for executing a game. For example, a game play command for performing an action of a character in the game may be transmitted to the display device 120, and tactile data (e.g., vibration) corresponding to the input play command may be received. If the input device 130 includes a haptic module that supports various tactile effects that the user may feel, the received tactile data may be reproduced.

According to an embodiment, in the case of a multi-player game, a plurality of input devices 130 may be connected to the display device 120. The plurality of input devices 130 may transmit, to the display device 120, their respective device information, such as manufacturer, model name, media access control (MAC) address, or device-specific identification information and each user's game play input.

According to an embodiment, the network 140 may interconnect the components 110 to 130 included in the cloud game system 100 based on a communication channel. Here, the connection may refer, for example, to each component 110 to 130 being related to one or more other components to be able to transmit or receive signals to/from the other components through one or more communication channels using wired or wireless resources.

According to an embodiment, the network 140 may be any of networks such as wireless fidelity (Wi-Fi), local area network (LAN), or wide area network (WAN). The network 140 may be implemented using various wired or wireless communication protocols, such as, e.g., Ethernet, global system for mobile communications (GSM), enhanced data GSM environment (EDGE), code division multiple access (CDMA), time division multiplexing access (TDMA), 5G, long term evolution (LTE), LTE advanced (LTE-A), Bluetooth, VoIP, WiMAX, or wireless broadband (WiBro).

The configuration of the cloud game system 100 illustrated is simply presented to aid in understanding, and the disclosure is not limited thereto.

Figure 2:
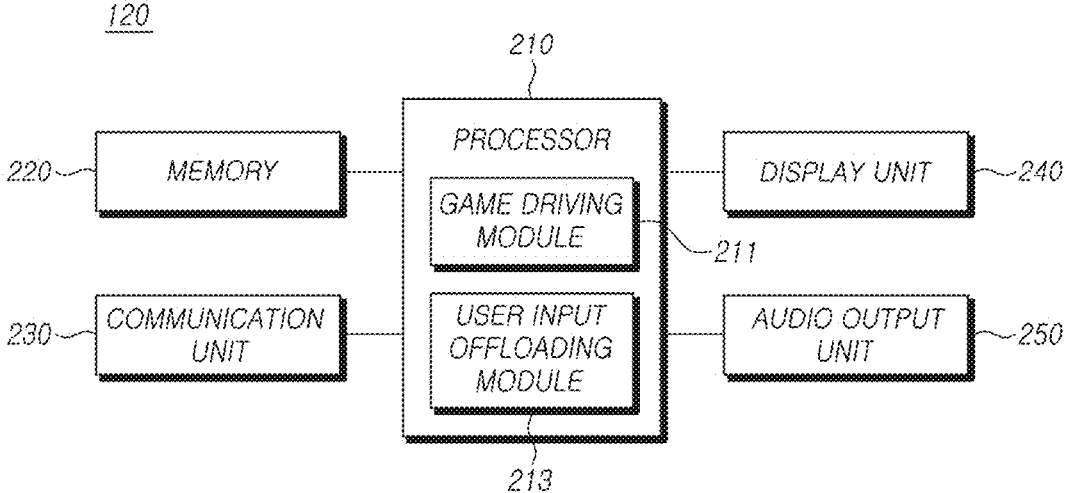
FIG. 2 is a block diagram illustrating an example configuration of a display device according to various embodiments.

FIG. 2 is a block diagram illustrating an example configuration of a display device (e.g., the display device 120 of FIG. 1) according to various embodiments.

Referring to FIG. 2, a display device 120 may include a processor (e.g., including processing circuitry) 210, memory 220, a communication unit (e.g., including communication circuitry) 230, a display unit (e.g., including a display) 240, and/or an audio output unit (e.g., including audio output circuitry) 250. The display device 120 may include additional components other than the illustrated components, or at least one of the illustrated components may be omitted.

According to an embodiment, the processor 210 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 210 may include, for example, a game driving module 211 and a user input offloading module 213, each of which may include various executable program instructions.

According to an embodiment, the processor 210 may control the game driving module 211, the user input offloading module 213, the memory 220, the display unit 240, the audio output unit 250, and the communication unit 230 to perform a specific operation.

According to an embodiment, the game driving module 211 may be a process of executing a game application on the display device 120.

According to an embodiment, the game driving module 211 may include, e.g., a browser engine such as a web browser engine or a cobalt engine. The browser engine may arrange and render data in the form of hypertext markup language (HTML), extensible markup language (XML), and cascading style sheet (CSS) on the user's screen.

According to an embodiment, the game driving module 211 may receive device information, such as, e.g., the manufacturer, model name, MAC address, or device-specific identification information about the input device 130, from the input device 130 connected via Bluetooth, Bluetooth low energy (BLE), or universal serial bus (USB). The device information may include information about the address of the memory in which the user input received from the input device 130 is stored. The game driving module 211 may transmit device information about the input device 130 to the user input offloading module 213.

According to an embodiment, the game driving module 211 may transmit, to the game server 110, a message including credentials for the user or the game account, e.g., the user name, login account, and password. The game driving module 211 may receive server information from the game server 110. The server information may include the uniform resource locator (URL) of the game server 110. The game driving module 211 may transmit the server information to the user input offloading module 213. The game driving module 211 may transmit information capable of performing authentication with the game server 110 to the user input offloading module 213. When the user input offloading module 213 connects a new session with the game server 110, the server information and information capable of performing the authentication may be used.

According to an embodiment, when it is determined that the game has started to be played, the game driving module 211 may generate the user input offloading module 213.

According to an embodiment, when the game driving module 211 identifies that the image stream data received from the game server 110 is a series of characteristic combinations, e.g., a combination of an intra-coded frame (I-frame) and a continuous predictive-coded frame (P-frame) greater than or equal to a predefined threshold, the game driving module 211 may determine that the game has started to play.

According to an embodiment, when the game server 110 and the streaming server are separated from each other, the game driving module 211 may be redirected to the streaming server while the game selected by the user is loaded on the screen. In this case, the game driving module 211 may recognize a change in the URL of the received game stream data and determine that the game has started to play.

According to an embodiment, the data received by the game driving module 211 from the game server 110 includes game output data and control data, and the game driving module 211 may determine that the game has started to play by obtaining a signal indicating that the game has started to play from the control data.

According to an embodiment, the user input offloading module 213 may be generated by the game driving module 211. Here, offloading may refer, for example, to a technique or structure that allows a task according to a designated function to be transferred to another processing device and performed. For example, the user input offloading module 213 may be generated as the game starts to play and receive part of the task processed by the game driving module 211 and perform the same. The user input offloading module 213 may access the game server 110 using server information received from the game driving module 211. The user input offloading module 213 may perform authentication with the game server 110 and generate a new session using the session used by the game driving module 211 with the game server 110 as it is or using authentication information received from the game driving module 211. The user input offloading module 213 may transmit the user input to the game server 110 through the session.

According to an embodiment, if the game starts to play, the user input offloading module 213 may receive the user input from the input device 130. The user input offloading module 213 may directly obtain the user input without passing through the game driving module 211 using address information about the memory storing the user input among device information received from the game driving module 211. The user input may be one of a game play command or a game configuration-related command. The user input offloading module 213 may transmit the received user input to the game server 110 using server information received from the game driving module 211. The user input offloading module 213 may determine whether the user input is a game play command or a game configuration-related command, or may transmit the user input to the game server 110 without processing the user input. Until the game starts to play, the game driving module 211 may receive the user input from the input device 130. For example, the game driving module 211 may receive device information about the input device 130 and transfer the device information to the user input offloading module 213, or may transmit the user input such as game selection to the game server 110.

According to an embodiment, the input delay may refer, for example, to a delay between the time of the user input and the time when the user input is reflected on the screen. For example, if the display device 120 updates 60 times per second (60 fps), and the input device 130 generates 60 user inputs per second, the allowable input delay time may be $1/60$ seconds (16.6 ms). In other words, the longest time required until the user input generated from the input device 130 is received by the display device 120 and is transferred to the game server 110, and the game output stream corresponding to the user input is received from the game server 110 and demultiplexed and decoded and output on the screen may be 16.6 ms. Considering the network delay that may occur between the display device 120 and the game server 110, the overall input delay may be increased over 16.6 ms. When one process performs the entire process from the input to the output, the input delay may be further increased due to thread contention and bottlenecks occurring at each stage of UI event, input/output processing, file system processing, or network event processing of the browser engine which is a base framework. Further, when one process performs the entire process from the input to the output, even if consecutive user inputs occur, the next user input is transferred to the game server 110 after the game screen output corresponding to the previous user input is completed, and thus the input delays may be accumulated.

According to an embodiment, the user input offloading module 213 may be an independent process that operates separately from the game driving module 211, and may be in charge of transmitting the user input generated by the input device 130 to the game server 110 after game starts to play. In other words, regardless of whether the game driving module 211 outputs game output data corresponding to a previous input of the user on the screen or whether the game output data is received from the game server 110, the user input offloading module 213 may transmit the user input to the game server 110 whenever the user input occurs in the input device 130.

According to an embodiment, the user input offloading module 213 is an independent process that operates separately from the game driving module 211, and may be in charge of transmitting the user input generated from the input device 130 to the game server 110 from the step of selecting the game. Since the user input generated in the step of selecting of the game does not affect the input delay compared to the user input generated after the start of game play, the time when the game driving module 211 delegates the user input to the user input offloading module 213 in the disclosure is not limited to only after the start of game play.

According to an embodiment, the user may designate whether to use the user input offloading module 213 when playing a game according to the product specifications of the display device 120 or the resource status such as memory usage or processor usage. For example, if the user input offloading module 213 is not used at the early stage of the game play, but is used in the middle of the game play, the user input offloading module 213 may transfer a user input to the game server 110 from that time.

According to an embodiment, the memory 220 is a storage medium used by the display device 120 and may include a program including at least one instruction. The program may include an operating system (OS) program and application programs.

According to an embodiment, the memory 220 may include at least one type of storage medium among a flash memory type, a hard disk type, a micro multimedia card type, a card type, RAM, SRAM, ROM, EEPROM, PROM, magnetic memory, a magnetic disk, and an optical disk.

According to an embodiment, the memory 220 may perform a function for temporarily storing the game image stream data or the sound stream data received from the game server 110.

According to an embodiment, the memory 220 may store cookies for the user's personal information.

According to an embodiment, the memory 220 may store device information about the input device 130 obtained when the game driving module 211 registers the input device 130, e.g., device information such as the manufacturer, the model name, the MAC address, or device-specific identification information.

According to an embodiment, the communication unit 230 may include various communication circuitry and provide an interface for wired/wireless communication with the game server 110 and the input device 130 of the cloud game system 100. The communication unit 230 may include a network interface card or a wireless transmission/reception unit that enables communication through an external network (e.g., the network 140 of FIG. 1). The communication unit 230 may perform signal processing for accessing a wireless communication network. The wireless communication network may be, but is not limited to, a communication network such as global system for mobile communications (GSM), enhanced data GSM environment (EDGE), code division multiple access (CDMA), time division multiplexing access (TDMA), 5G, long term evolution (LTE), LTE advanced (LTE-A), Bluetooth, BLE (BI VoIP), WiMAX, or wireless broadband (WiBro).

According to an embodiment, the communication unit 230 may perform short-range wireless communication such as Bluetooth or Bluetooth low energy (BLE) with the input device 130 or may perform wired communication using universal serial bus (USB). The game driving module 211 or the user input offloading module 213 may transmit or receive data to or from the input device 130 through the communication unit 230.

According to an embodiment, the communication unit 230 may perform wired/wireless communication with the game server 110 through a network (e.g., the network 140 of FIG. 1). The game driving module 211 or the user input offloading module 213 may transmit or receive data to or from the game server 110 through the communication unit 230.

According to an embodiment, the display unit 240 is a display device and may include a display, such as, for example, and without limitation, a liquid crystal display (LCD), a light emitting diode (LED) display, an organic light emitting diode (OLED) display, a plasma display panel (PDP) display, a flexible display, a 3D display, etc.

According to an embodiment, the display unit 240 may include decoders of various standards, and may decode and output the game image stream transferred from the game driving module 211.

According to an embodiment, the audio output unit 250 may include various audio output circuitry and decode the game sound stream transferred from the game driving module 211 to convert an electrical signal into sound. The audio output unit 250 may output, e.g., a sound stream through a speaker or an earphone.

Figure 3:
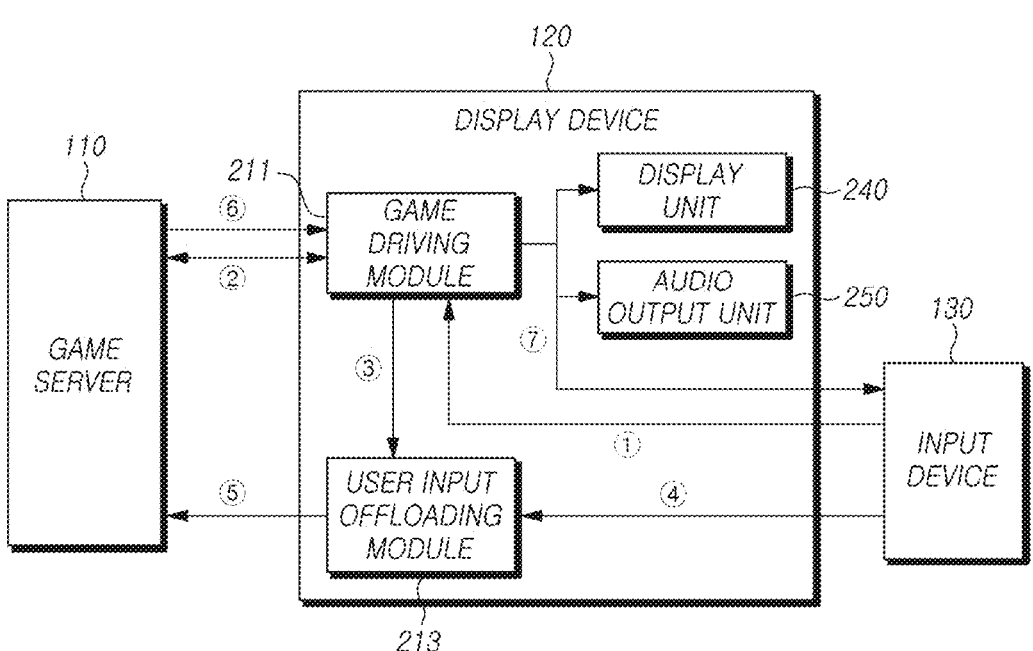
FIG. 3 is a block diagram illustrating example flow of data in a process of playing a game according to various embodiments.

FIG. 3 is a block diagram illustrating example data flow in a process of playing a game according to various embodiments.

Referring to FIG. 3, according to an embodiment, the game driving module 211 may obtain device information from the input device 130 (operation ①). The game driving module 211 may request credentials from the game server 110 and receive server information about the game server 110, e.g., a uniform resource locator (URL) (operation ②). When it is determined that game play has started, the game driving module 211 may generate the user input offloading module 213, and may transmit the device information about the input device 130 and the server information about the game server 110 to the user input offloading module 213 (operation ③). The game driving module 211 may delegate the user input generated by the input device 130 to the user input offloading module 213. Since the game driving module 211 and the user input offloading module 213 are independent, separate processes, the game driving module 211 may transmit a delegation message to the user input offloading module 213 using inter process communication (IPC). The user input that the user inputs through the input device 130 may be transferred to the user input offloading module 213 (operation ④). The user input offloading module 213 may transfer the received user input to the game server 110 (operation ⑤). The game driving module 211 may receive game stream data corresponding to the user input from the game server 110 (operation ⑥). The game driving module 211 may demultiplex the received game stream data, may output the image stream data through the display unit 240, may output the sound stream data through the audio output unit 250, and may transfer the vibration data to the input device 130 (operation ⑦). When the input device 130 includes a vibration module including a vibration element capable of being driven by vibration data, a vibration effect may be generated based on the received vibration data. For example, when executing a fighting game, the user may experience an actual sense of hitting through vibration feedback of the input device 130 corresponding to his/her game play command.

Figure 4:
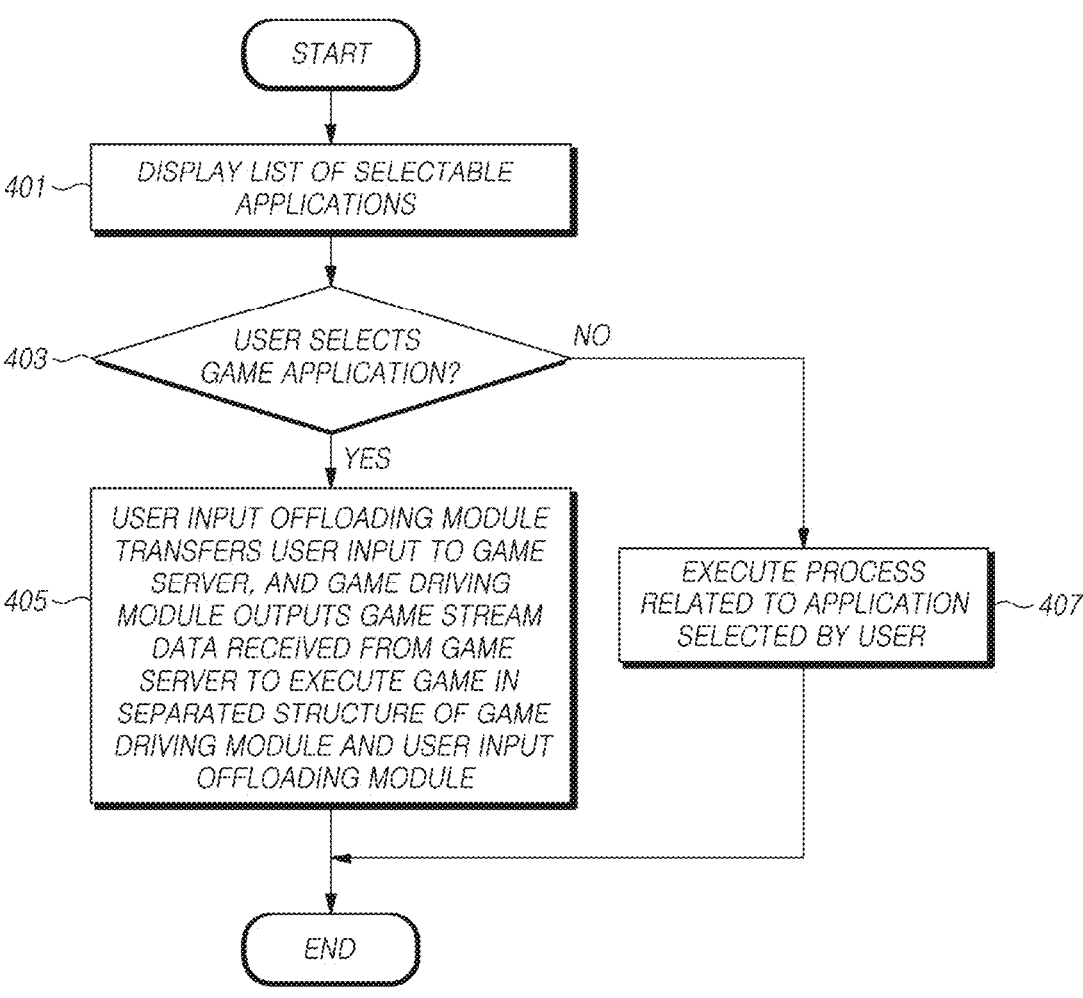
FIG. 4 is a flowchart illustrating example operations of a display device according to various embodiments.

FIG. 4 is a flowchart illustrating example operations of a display device according to various embodiments.

Referring to FIG. 4, in operation 401 according to an embodiment, if power is applied or a home screen is selected, the display device 120 may display a list of selectable applications.

In operation 403 according to an embodiment, if the user selects a game application, the display device 120 may perform operation 405, and if the user does not select a game application, the display device 120 may perform operation 407.

In operation 405 according to an embodiment, the display device 120 may execute a game through two separate modules that function independently, e.g., the game driving module 211 and the user input offloading module 213. The user input offloading module 213 may perform a function of transferring the user input received through the input device 130 to the game server 110, and the game driving module 211 may perform a function of outputting game stream data received from the game server 110.

In operation 407 according to an embodiment, the display device 120 may execute a process corresponding to the application selected by the user.

FIG. 5 is a flowchart illustrating example operations of a game driving module (e.g., the game driving module 211 of FIG. 2) according to various embodiments.

Referring to FIG. 5, in operation 501 according to an embodiment, the game driving module 211 may determine whether the input device 130 is an input device capable of game input. If the input device 130 is a legacy remote controller (e.g., an IR remote controller) that does not include a data transmission/reception function, the game driving module 211 may end the game without performing the game. If the input device 130 is an input device capable of inputting a game, the game driving module 211 may perform operation 503.

In operation 503 according to an embodiment, the game driving module 211 may perform connection by pairing with the input device 130 and may perform a procedure of registering the input device 130. The game driving module 211 may receive device information such as the manufacturer, the model name, the MAC address, or device-specific identification information from the input device 130. The game driving module 211 may receive information about the address of the memory in which the user input received from the input device 130 is stored.

In operation 505 according to an embodiment, the game driving module 211 may receive server information such as the URL of the game server 110 from the game server 110 and may perform the user authentication process by transmitting the message including credentials, e.g., the user name, the login account, and the password.

In operation 507 according to an embodiment, the game driving module 211 may output the game list received from the game server 110 on the screen and obtain the user's selection.

In operation 509 according to an embodiment, the game driving module 211 may output, on the screen, whether to use the user input offloading module 213 of the display device 120. For example, when the display device 120 is a low-spec product, the user may not use the user input offloading module 213. Alternatively, the game driving module 211 may output whether the user input offloading module 213 is available on the screen in consideration of resource information such as the power supply status, the power mode, the memory and processor usage of the display device 120.

In operation 511 according to an embodiment, the game driving module 211 may obtain, from the user, a selection as to whether to delegate the user input using the user input offloading module 213. If the user selects to use the user input offloading module 213, the game driving module 211 may perform operation 513, otherwise, operation 525.

In operation 513 according to an embodiment, the game driving module 211 may generate the user input offloading module 213.

In operation 515 according to an embodiment, the game driving module 211 may transmit device information about the input device 130 and server information about the game server 110 to the user input offloading module 213. The device information may include information about the manufacturer of the input device 130, the model name, the MAC address, device-specific identification information, or the address of the memory storing the user input received from the input device 130.

In operation 517 according to an embodiment, when the game stream data is received from the game server 110, the game driving module 211 may perform operation 519, and when the game stream data is not received, the game driving module 211 may return to the game streaming reception standby state.

In operation 519 according to an embodiment, the game driving module 211 may demultiplex the received game stream data and may output the image stream data through a display unit (e.g., the display unit 240 of FIG. 2), and may output the sound stream data through an audio output unit (e.g., the audio output unit 250 of FIG. 2).

In operation 521 according to an embodiment, when the received game stream data is a game termination sequence, the game driving module 211 may perform operation 523, otherwise, the game driving module 211 may return to the game streaming reception standby state.

In operation 523 according to an embodiment, the game driving module 211 may terminate the user input offloading module 213.

In operation 525 according to an embodiment, if the user input is received from the input device 130, the game driving module 211 may perform operation 527, and if the user input is not received, the game driving module 211 may return to the user input reception standby state.

In operation 527 according to an embodiment, the game driving module 211 may transfer the user input received from the input device 130 to the game server 110.

Operations 529 to 531 according to an embodiment are the same as or similar to operations 517 to 519 described above and redundant descriptions are not repeated here.

In operation 533 according to an embodiment, if the game termination sequence is received from the game server 110, the game driving module 211 may terminate the process, and if the game termination sequence is not received, the game driving module 211 may return to operation 525.

Figure 6:
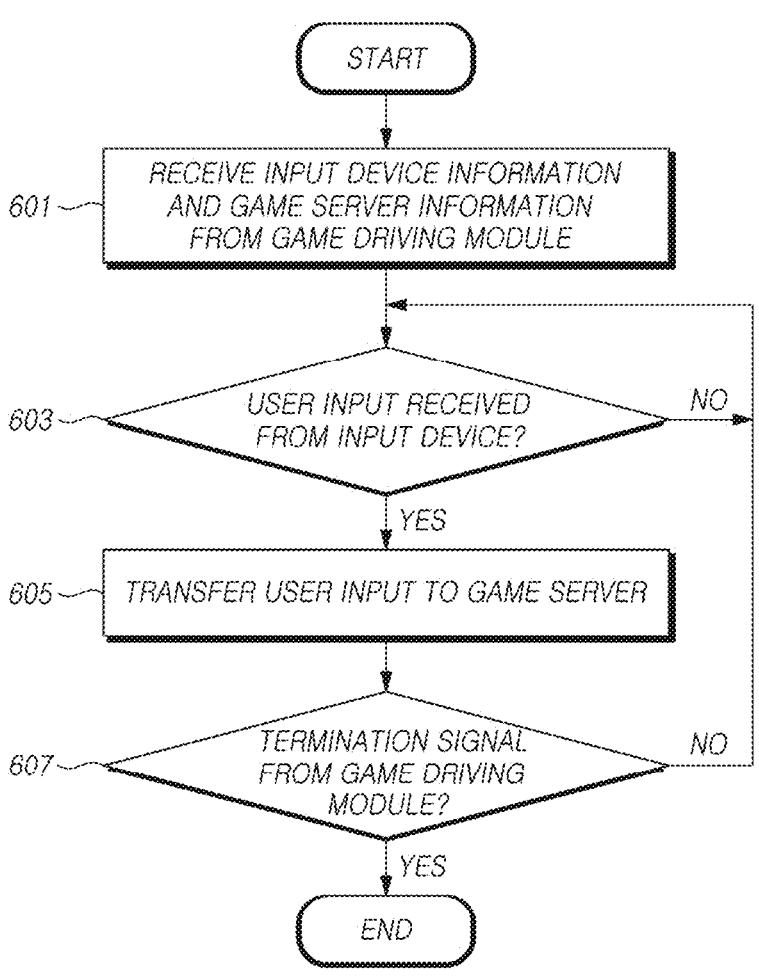
FIG. 6 is a flowchart illustrating example operations of an input offloading module according to various embodiments.

FIG. 6 is a flowchart illustrating example operations of a user input offloading module (e.g., the user input offloading module 213 of FIG. 2) according to various embodiments.

Referring to FIG. 6, in operation 601 according to an embodiment, the user input offloading module 213 may receive device information such as the manufacturer, the model name, the MAC address, or device-specific identification information about the input device 130 from the game driving module 211. The device information may include information about the address of the memory in which the user input received from the input device 130 is stored.

In operation 603 according to an embodiment, if the user input is received from the input device 130, the user input offloading module 213 may perform operation 605, and if the user input is not received, the user input offloading module 213 may return to the message reception standby state.

In operation 605 according to an embodiment, the user input offloading module 213 may transfer the received user input to the game server 110.

In operation 607 according to an embodiment, if the termination signal is received from the game driving module 211, the user input offloading module 213 may terminate the process, and if the termination signal is not received, the user input offloading module 213 may return to the message reception standby state.

Figure 7:
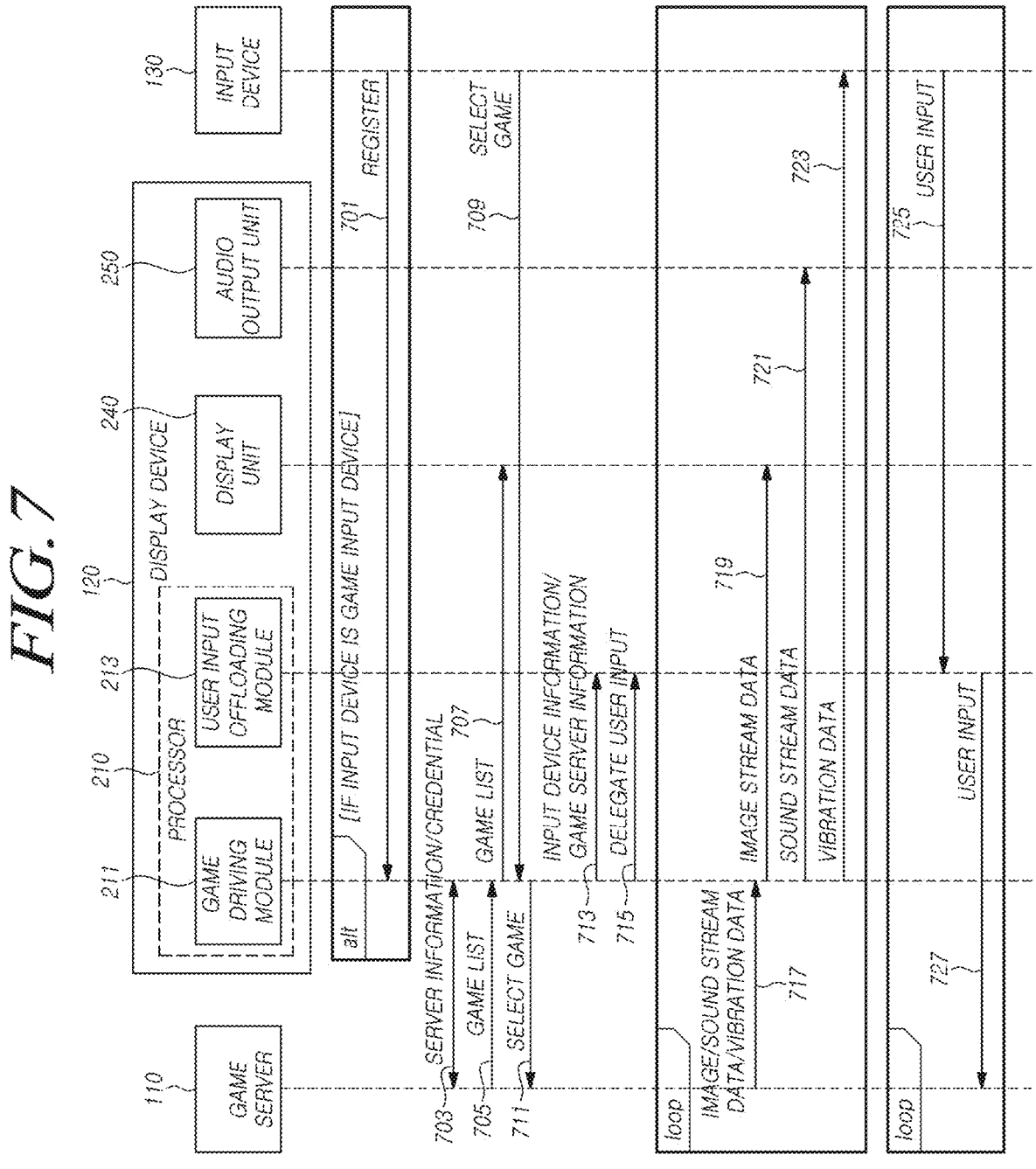
FIG. 7 is a signal flow diagram illustrating example operations of a display device according to various embodiments.

FIG. 7 is a signal flow diagram illustrating example operations of a display device according to various embodiments.

Referring to FIG. 7, according to an embodiment, the input device 130 (e.g., the input device 130 of FIG. 1) may request the game driving module 211 to register (operation 701). The input device 130 may be paired with the game driving module 211 to perform connection, and may transmit its own manufacturer, model name, MAC address, or device-specific identification information. If the game driving module 211 determines that the input device 130 is an input device capable of playing a game, the game driving module 211 may register the input device 130. For example, if the input device 130 is a legacy remote controller (e.g., an IR remote controller) that does not include a data transmission/reception function, the game driving module 211 may not perform the registration procedure. The game driving module 211 may obtain device information about the input device 130 and store the device information in memory (e.g., the memory 220 of FIG. 2). In operation 703, the game driving module 211 may receive server information about the game server 110 from the game server 110. The server information may include the URL of the game server 110. The game server 110 may transmit its own server information to the game driving module 211. The game driving module 211 may transmit credentials, e.g., the message including the user name, the login account, and the password, to the game server 110. The game server 110 may receive the credential message from the game driving module 211. The game server 110 may perform the credentialing process by referring to the user account and user payment information, and game data for each user account, e.g., game session information such as game points, game items, game levels, and game progress status.

In operation 705, the game server 110 may transmit image data including a game list to the game driving module 211. The game driving module 211 may receive image data including the game list from the game server 110. The game list may be all games held by the user or all games available within the user's authority.

In operation 707, the game driving module 211 may transmit image data including the game list to the display unit 240 (e.g., the display unit 240 of FIG. 2) and may output the image data on a screen. The display unit 240 may receive image data including the game list from the game driving module 211 and output the image data on a screen.

In operation 709, if the user selects a game to be played from the game list presented on the screen through the input device 130, the input device 130 may transmit the user input to the game driving module 211. The game driving module 211 may receive the user input from the input device 130.

In operation 711, the game driving module 211 may transmit the received user input to the game server 110.

In operation 713, the game driving module 211 may generate the user input offloading module 213 and may transmit device information about the input device 130 and server information about the game server 110 to the user input offloading module 213. The device information may include information about the manufacturer of the input device 130, the model name, the MAC address, device-specific identification information, or the address of the memory storing the user input received from the input device 130. The user input offloading module 213 may receive device information about the input device 130 and server information about the game server 110 from the game driving module 211.

In operation 715, the game driving module 211 may transmit the message for delegating user input processing received from the input device 130 to the user input offloading module 213. The user input offloading module 213 may receive a message for delegating user input processing from the game driving module 211.

According to an embodiment, operations 713 to 715 may be performed prior to operation 709. Since the input processing process for selecting a game is not at a level that affects the input delay compared to the user input generated while the game is being played, the game driving module 211 may process the user input for selecting the game, or the user input offloading module 213 may process the user input from the game selection process.

In operation 717, the game server 110 may stream game data to the game driving module 211 until the game is finished. The game driving module 211 may receive game data from the game server 110 until the game is finished.

In operation 719, as a result of demultiplexing the game stream data received from the game server 110, the game driving module 211 may transmit the separated image stream data to the display unit 240. The display unit 240 may receive image stream data from the game driving module 211, decode the image stream data, and output the image stream data on a screen.

In operation 721, as a result of demultiplexing the game stream data received from the game server 110, the game driving module 211 may transmit the separated sound stream data to the audio output unit 250. The audio output unit 250 may receive sound stream data from the game driving module 211, decode the sound stream data, and output the sound stream data through, e.g., a speaker.

In operation 723, as a result of demultiplexing the game stream data received from the game server 110, the game driving module 211 may transmit the separated vibration data to the input device 130. The input device 130 may receive vibration data from the game driving module 211. If the input device 130 includes a vibration module that generates vibration, the vibration data may be output.

Operations 717 to 723 may be repeated while game play is being performed.

In operation 725, the input device 130 may transmit the user input to the user input offloading module 213. The user input offloading module 213 may receive the user input from the input device 130.

In operation 727, the user input offloading module 213 may transfer the user input to the game server 110. The game server 110 may receive the user input from the user input offloading module 213.

Operations 725 to 727 may be repeated while game play is being performed. Operations 725 to 727 may be performed simultaneously with operations 717 to 723.

Figure 8:
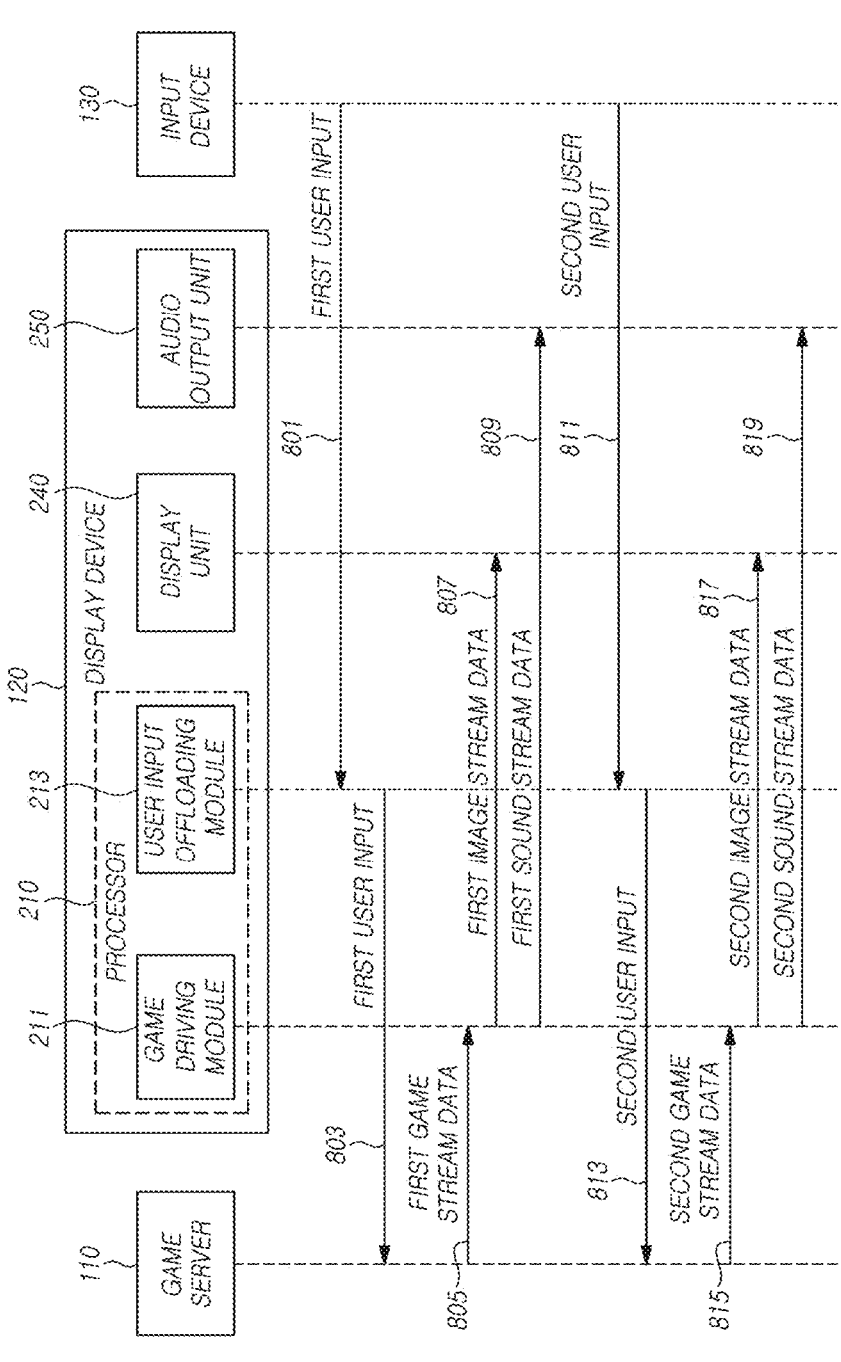
FIG. 8 is a signal flow diagram illustrating example operations during a game play input and game output according to various embodiments.

FIG. 8 is a signal flow diagram illustrating example operations during a game play input and game output according to various embodiments.

Referring to FIG. 8, according to an embodiment, the user input received from the input device 130 after a game is started may be delegated to the user input offloading module 213, and the stream data of the game may be data obtained by multiplexing image stream data and sound stream data.

In operation 801, the input device 130 may transmit a first user input to the user input offloading module 213. The user input offloading module 213 may receive the first user input from the input device 130.

In operation 803, the user input offloading module 213 may transmit the first user input to the game server 110. The game server 110 may receive the first user input from the user input offloading module 213.

In operation 805, the game server 110 may transmit first game stream data corresponding to the first user input to the game driving module 211. The game driving module 211 may receive the first game stream data from the game server 110.

In operation 807, the game driving module 211 may transmit the first image stream data obtained by demultiplexing the first game stream data to the display unit 240. The display unit 240 may receive the first image stream data from the game driving module 211.

In operation 809, the game driving module 211 may transmit the first sound stream data obtained by demultiplexing the first game stream data to the audio output unit 250. The audio output unit 250 may receive the first sound stream data from the game driving module 211.

In operation 811, the input device 130 may transmit a second user input to the user input offloading module 213. The user input offloading module 213 may receive the second user input from the input device 130.

In operation 813, the user input offloading module 213 may transmit the second user input to the game server 110. The game server 110 may receive the second user input from the user input offloading module 213.

In operation 815, the game server 110 may transmit second game stream data corresponding to the second user input to the game driving module 211. The game driving module 211 may receive the second game stream data from the game server 110.

In operation 817, the game driving module 211 may transmit the second image stream data obtained by demultiplexing the second game stream data to the display unit 240. The display unit 240 may receive the second image stream data from the game driving module 211.

In operation 819, the game driving module 211 may transmit the second sound stream data obtained by demultiplexing the second game stream data to the audio output unit 250. The audio output unit 250 may receive the second sound stream data from the game driving module 211.

Figure 9:
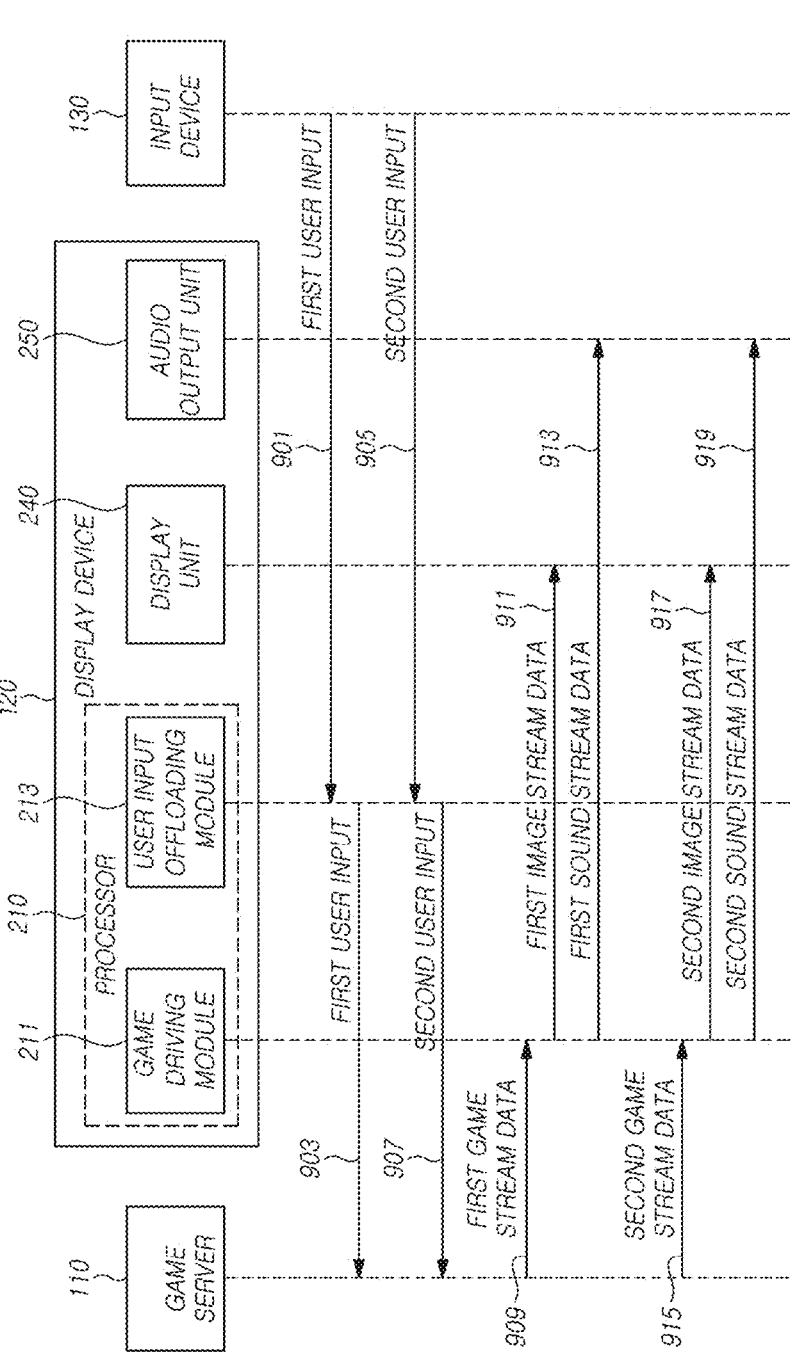
FIG. 9 is a signal flow diagram illustrating example operations during a game play input and game output according to various embodiments.

FIG. 9 is a signal flow diagram illustrating example operations during a game play input and game output according to various embodiments.

Referring to FIG. 9, according to an embodiment, the user input received from the input device 130 after a game is started may be delegated to the user input offloading module 213, and the stream data of the game may be data obtained by multiplexing image stream data and sound stream data.

In operation 901, the input device 130 may transmit a first user input to the user input offloading module 213. The user input offloading module 213 may receive the first user input from the input device 130.

In operation 903, the user input offloading module 213 may transmit the first user input to the game server 110. The game server 110 may receive the first user input from the user input offloading module 213.

In operation 905, the input device 130 may transmit a second user input to the user input offloading module 213. The user input offloading module 213 may receive the second user input from the input device 130.

In operation 907, the user input offloading module 213 may transmit the second user input to the game server 110. The game server 110 may receive the second user input from the user input offloading module 213. The user input offloading module 213 may transfer the user input to the game server 110 whenever the user input is received from the input device 130, regardless of whether the game driving module 211 has received the game stream data corresponding to the first user input.

Operations 909 to 913 are the same as or similar to operations 805 to 809 of FIG. 8, and operations 915 to 919 are the same as or similar to operations 815 to 819 of FIG. 8, and thus a description thereof may not be repeated.

Figure 10:
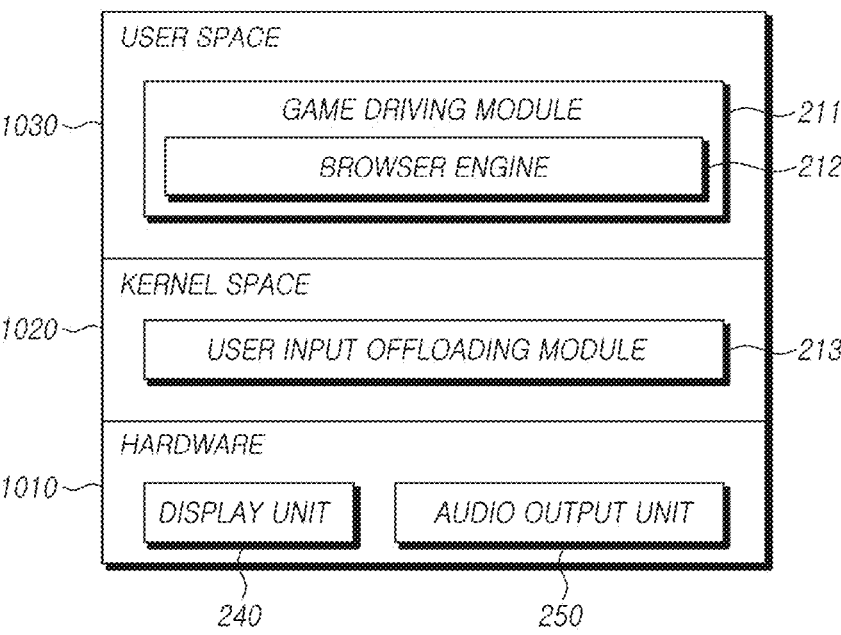
FIG. 10 is a diagram illustrating a hierarchical structure of a display device according to various embodiments.

FIG. 10 is a diagram illustrating an example hierarchical structure of a display device 120 according to various embodiments.

Referring to FIG. 10, the layers of the display device 120 according to an embodiment may be divided into a hardware 1010 layer, a kernel space 1020, and the user space 1030.

According to an embodiment, the display unit (e.g., including a display) 240 and the audio output unit (e.g., including audio output circuitry) 250 may be included in the hardware 1010 layer.

According to an embodiment, the user input offloading module 213 may be positioned in the kernel space 1020. The kernel is a core part of the operating system and may provide various services necessary to perform other parts and applications. Elements of the kernel, e.g., a task manager, a memory manager, a file system manager, a network manager, and a device driver manager, may be present in the kernel space 1020. If a process operating in the user space 1030 needs to access resources managed by the kernel, a request may be transferred to the resource manager of the kernel space 1020 through a system call. The resource manager may transmit the request for the process to the resource corresponding to the request and process the task.

According to an embodiment, since the Linux-based kernel provides a method in which some functions of the kernel are separated into modules and then merged to the kernel as needed to enhance flexibility, the user input offloading module 213 may be merged to the kernel.

According to an embodiment, as the user input offloading module 213 operates in the kernel space 1020, the occurrence of context switching may be reduced, which is described below with reference to FIG. 11.

According to an embodiment, the user input offloading module 213 may operate in the form of a Daemon. The user input offloading module 213 is a process for providing a service for transferring the user input to the game server 110 while operating in the background of the operating system, and may be invoked in response to occurrence of a predetermined specific event, e.g., an event of receiving a message from the input device 130.

According to an embodiment, the user input offloading module 213 may be implemented as a driver. The driver may be a passage connecting the operating system of the display device 120 and the input device 130, and may be a library provided by the kernel so that the input device 130 may be used in the application program of the display device 120.

According to an embodiment, the user input offloading module 213 may operate independently of the game driving module 211 in the user space 1030.

According to various embodiments of the disclosure, the user input offloading module 213 is a separate software module that operates by being delegated by the game driving module 211 for the task of transferring the user input generated by the input device 130 to the game server 110, and the operating area is not limited to a specific area or to a specific type.

According to an embodiment, the game driving module 211 may be positioned in the user space 1030. A process including the game driving module 211 and operating in the user space 1030 may use resources managed by the kernel through a system call.

According to an embodiment, the game driving module 211 may include a browser engine 211, e.g., a browser engine such as a web browser engine or a cobalt engine. The browser engine 211 may is a piece of software that arranges and renders data in the form of hypertext markup language (HTML), extensible markup language (XML), and cascading style sheet (CSS) on the user's screen and may be included in various web content-based application programs.

Figure 11A:
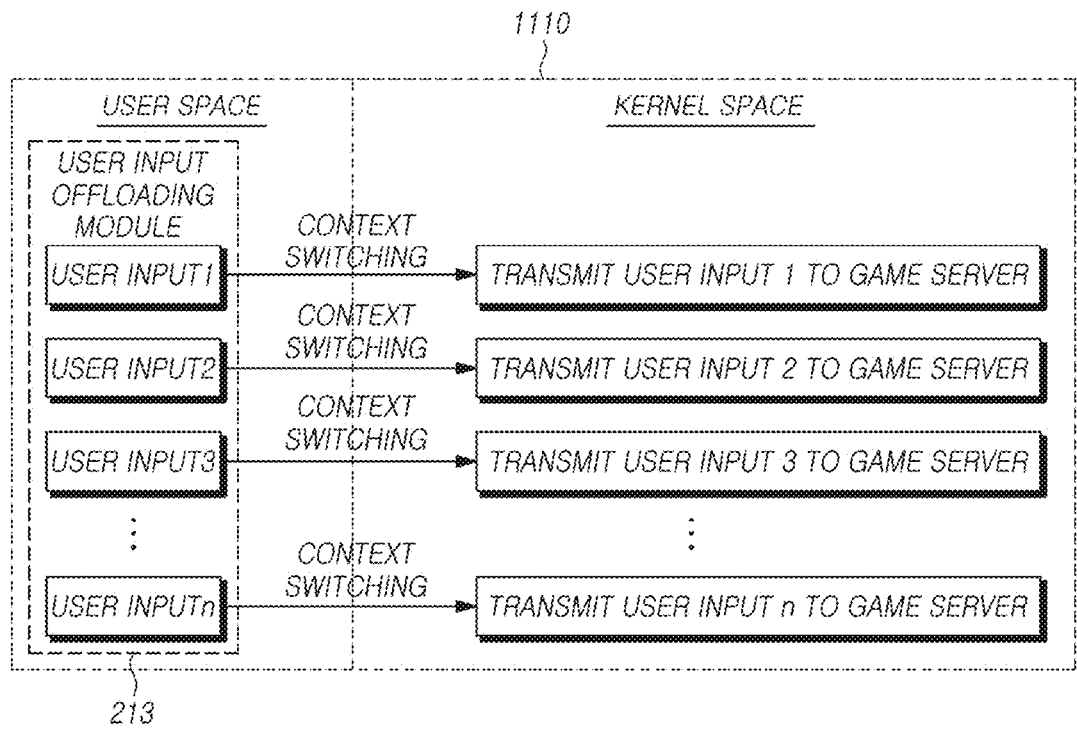
FIGS. 11A and 11B are diagrams illustrating an example change in context switching when a user input offloading module operates in a kernel space according to various embodiments.
Figure 11B:
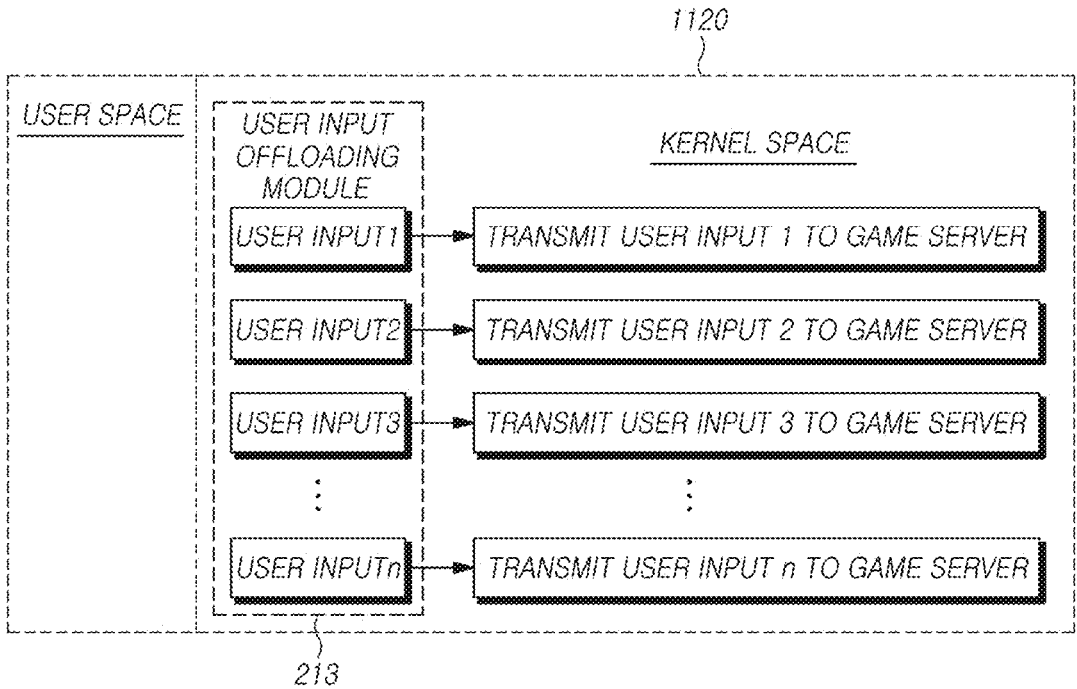

FIGS. 11A and 11B are diagrams illustrating example changes in context switching when a user input offloading module 213 operates in a kernel space according to various embodiments.

Referring to FIG. 11A 1110 according to an embodiment may be a case where the user input offloading module 213 operates in the user space (e.g., the user space 1030 of FIG. 10).

According to an embodiment, context switching may be an operation of storing a structure indicating the attributes of the previous process in the process control block (PCB) and loading the state of the process to be newly executed, in order to allow another process to use the CPU while one process is using the CPU. The PCB may store data such as the state of the process such as generation, preparation, execution, waiting, and stopping, the program counter that is the address of the instruction to be executed next by the process, the register, and process-specific identification information.

According to an embodiment, context switching may occur due to a process of processing a system call, an interrupt from an input/output device, or an interrupt due to expiration of a timer.

According to an embodiment, when the user input offloading module 213 operates in the user space (1110), a system call (e.g., a transmission function such as sendto( )) is used in the process of transmitting the user input received from the input device 130 to the game server 110, so that context switching may occur from the user space to the kernel space. By the nature of the game input device, the user input has a small data size but frequently occurs, and context switching may occur whenever the user input is transmitted to the game server 110. Frequent context switching may act as an overhead to the display device 120, and the user input delay may occur due to the overall performance degradation of the display device 120, thereby deteriorating the responsiveness of the game.

According to an embodiment, referring to FIG. 11B, 1120 may be a case where the user input offloading module 213 operates in the kernel space (e.g., the kernel space 1020 of FIG. 10).

According to an embodiment, when the user input offloading module 213 operates in the kernel space 1120, context switching may not occur while transmitting the user input received from the input device 130 to the game server 110.

FIG. 12 is a state transition diagram of a game driving module (e.g., the game driving module 211 of FIG. 2) according to various embodiments.

Referring to FIG. 12, the transitionable states of the game driving module 211 may include an initial mode 1210, a connection mode 1220, a reception standby mode 1230, an output mode 1240, and a termination mode 1250.

According to an embodiment, the initial mode 1210 may be a state in which a process of the game driving module 211 is generated and loaded onto memory (e.g., the memory 220 of FIG. 2) of the display device 120. If an event in which the user selects a game application on the display device 120 occurs, the game driving module 211 may enter the initial mode 1210. If an operation of initializing internal resources and variables of the game driving module 211 in the initial mode 1210 is performed (operation 1211), the state of the game driving module 211 may transition from the initial mode 1210 to the connection mode 1220.

According to an embodiment, the connection mode 1220 may be a state in which the game driving module 211 performs connection with the input device 130 or the game server 110. If the connection process is completed (operation 1221), the state of the game driving module 211 may transition from the connection mode 1220 to the reception standby mode 1230. If an event of terminating (operation 1222) the game application occurs from the user, the state of the game driving module 211 may transition from the connection mode 1220 to the termination mode 1250.

According to an embodiment, the reception standby mode 1230 may be a state in which the game driving module 211 generates (operation 1233) the user input offloading module 213 and waits to receive game stream data from the game server 110. If the game driving module 211 receives the game stream data from the game server 110 (operation 1231), the state of the game driving module 211 may transition from the reception standby mode 1230 to the output mode 1240. If an event of terminating (operation 1232) the game application occurs from the user, the state of the game driving module 211 may transition from the reception standby mode 1230 to the termination mode 1250.

According to an embodiment, the output mode 1240 may be a state in which the game driving module 211 demultiplexes the received game stream data and outputs the separated image and/or sound stream data through a display unit (e.g., the display unit 240 of FIG. 2) and/or an audio output unit (e.g., the audio output unit 250 of FIG. 2). If the game driving module 211 completes the output of the game stream data (operation 1241), the state of the game driving module 211 may transition from the output mode 1240 to the reception standby mode 1230. If an event of terminating (operation 1242) the game application occurs from the user, the state of the game driving module 211 may transition from the output mode 1240 to the termination mode 1250.

According to an embodiment, the termination mode 1250 may be a state in which the game driving module 211 terminates, and the game driving module 211 may first terminate the user input offloading module 213 process and release the resource used by the game driving module 211.

Figure 13:
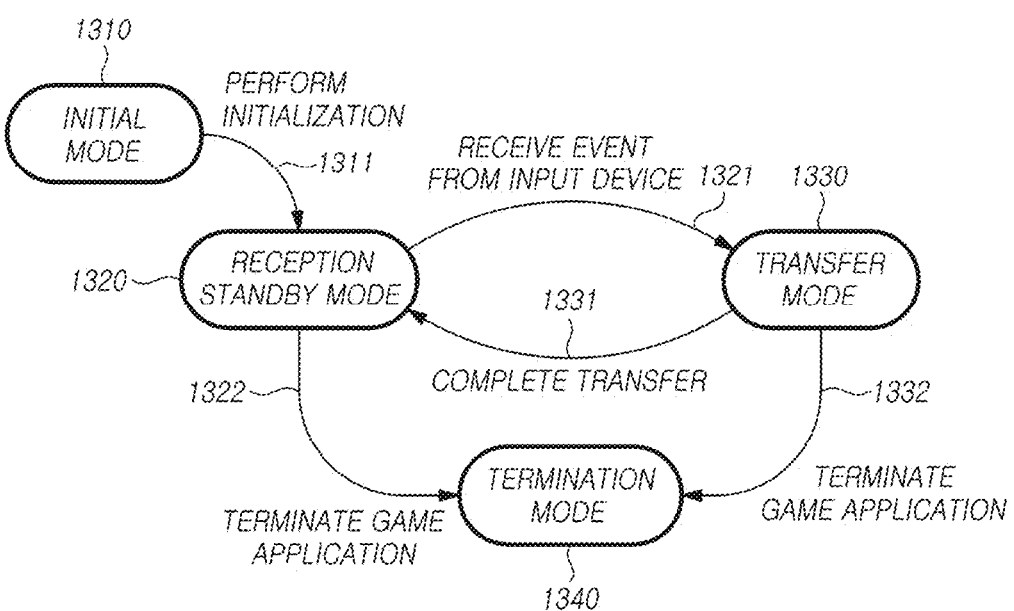
FIG. 13 is a state transition diagram view of an input offloading module according to various embodiments.

FIG. 13 is a state transition diagram of a user input offloading module (e.g., the user input offloading module 213 of FIG. 2) according to various embodiments.

Referring to FIG. 13, the transitionable states of the user input offloading module 213 may include an initial mode 1310, a reception standby mode 1320, a transfer mode 1330, and a termination mode 1340.

According to an embodiment, the initial mode 1310 may be a state in which the user input offloading module 213 is generated by the game driving module 211 and loaded onto memory (e.g., the memory 220 of FIG. 2) of the display device 120. If an operation of initializing the internal resources and variables of the user input offloading module 213 in the initial mode 1310 is performed (operation 1311), the state of the user input offloading module 213 may transition from the initial mode 1310 to the reception standby mode 1320.

According to an embodiment, the reception standby mode 1320 may be a state in which the user input offloading module 213 waits to receive a user input from the input device 130. If an event in which the user input offloading module 213 receives a user input from the input device 130 occurs (operation 1321), the state of the user input offloading module 213 may transition from the reception standby mode 1320 to the transfer mode 1330. If an event in which the game application terminates (operation 1322) occurs, the state of the user input offloading module 213 may transition from the reception standby mode 1320 to the termination mode 1340.

According to an embodiment, the transfer mode 1330 may be a state in which the user input offloading module 213 transfers the user input to the game server 110. If the user input offloading module 213 transfers the user input to the game server 110 (operation 1331), the state of the user input offloading module 213 may return from the transfer mode 1330 to the reception standby mode 1320. If an event in which the game application terminates (operation 1332) occurs, the state of the user input offloading module 213 may transition from the transfer mode 1330 to the termination mode 1340.

According to an embodiment, the termination mode 1340 may be a state in which the user input offloading module 213 terminates, and the user input offloading module 213 may release the resource used by the user input offloading module 213.

Functions executed by the electronic device and each module described in the disclosure may be implemented by hardware components, software components, and/or combinations of the hardware components and the software components. The software may include computer programs, codes, instructions, or combinations of one or more thereof and may configure or control the processing device to operate as desired. The software may be implemented as a computer program including instructions stored in computer-readable storage media. The computer-readable storage medium may include, e.g., a magnetic storage medium such as read-only memory (ROM), random-access memory (RAM), a floppy disk, a hard disk, or the like, or an optical storage medium such as a CD-ROM, a digital versatile disc (DVD), or the like. The computer-readable storage medium may be provided in the form of a non-transitory storage medium. Here, the "non-transitory" storage medium does not include a signal and is tangible, but this term does not differentiate between where data is semi-permanently stored in the storage medium and where data is temporarily stored in the storage medium.

According to embodiments of the disclosure, the program may be included and provided in a computer program product. The computer program products may include software programs or computer-readable storage media storing the software programs. For example, the computer program products may include software program-type products (e.g., downloadable applications (apps)) that are electronically distributed through manufacturers of electronic devices or electronic markets (e.g., Google Play Store or App Store). For electronic distribution, at least part of the software programs may be stored in storage media or temporarily generated. In this case, the storage media may be storage media of relay servers that temporarily store the software programs, servers of electronic markets, or servers of manufacturers.

The computer program product may include a storage medium of a server or a storage medium of a device in a system including the server and the device. Alternatively, when there is a third device (e.g., a smart phone) that is communicatively connected to the server or device, the computer program product may include a storage medium of the third device. The computer program product may include the software program itself transmitted from the server to the device or the third device, or transmitted from the third device to the device. In this case, one of the server, the device, and the third device may execute the computer program product to perform the method according to the disclosed embodiments. Two or more of the server, the device, and the third device may execute the computer program product to distributively implement the method according to the disclosed embodiments. For example, the server may execute the computer program product stored in the server to control the device communicatively connected with the server to perform the method according to the disclosed embodiments. As another example, the third device may execute the computer program product to control the device communicatively connected to the third device to perform the method according to the disclosed embodiment. When the third device executes the computer program product, the third device may download the computer program product from the server and execute the downloaded computer program product. Alternatively, the third device may execute the computer program product provided in a pre-loaded state to perform the method according to the disclosed embodiments.

The terms as used herein are provided simply to describe various embodiments thereof, but are not intended to limit the disclosure. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a communication unit comprising communication circuitry configured to transmit/receive data to/from a game server or an input device comprising input circuitry through a network;
   a display unit comprising a display;
   an audio output unit comprising audio output circuitry;
   memory storing at least one program; and
   at least one processor, comprising processing circuitry, electrically connected to the display unit, the audio output unit, the memory, and/or the communication unit and individually and/or collectively configured to execute at least one instruction of the program stored in the memory,
   wherein at least one processor, individually and/or collectively, is configured to, based on obtaining an event for selecting a game application, execute a game driving module and transfer, by the game driving module, game authentication information requesting a credential to the game server through the communication unit, and
   wherein the game driving module is configured to, based on recognizing that a game corresponding to the event starts, generate an input offloading module to transfer an input from the input device to the game server through the communication unit and provide delegation information necessary for transferring the input to the game server, to the input offloading module.

2. The electronic device of claim 1, wherein the input includes at least one of a game play command and a game configuration-related command,
   wherein the delegation information includes device information about the input device and server information about the game server,
   wherein the device information includes at least one of device-specific identification information, manufacturer, product information, MAC address, or memory address information about the input device, and
   wherein the memory address indicates a location where the input is stored in the memory.

3. The electronic device of claim 1, wherein at least one processor, individually and/or collectively, is configured to: based on the input offloading module receiving a second input from the input device, control the input offloading module to transfer the second input to the game server regardless of whether game stream data corresponding to a first input transmitted to the game server is received.

4. The electronic device of claim 1, wherein at least one processor, individually and/or collectively, is configured to: based on the input offloading module receiving a second input from the input device, control the input offloading module to transfer the second input to the game server regardless of whether an operation of outputting, through the display unit and/or the audio output unit, game stream data corresponding to a first input transmitted to the game server is completed.

5. The electronic device of claim 1, wherein the input offloading module is configured to operate in a kernel space.

6. The electronic device of claim 1, wherein at least one processor, individually and/or collectively, is configured to:
  control the game driving module to output, on a screen, whether the input offloading module is available and/or used considering at least one of a specification or resource state of the electronic device;
  control the game driving module to suggest whether to use the input offloading module and, based on obtaining an input indicating that the input offloading module is not being used, control the game driving module to transfer the input to the game server; and
  control the game driving module to suggest whether the input offloading module is used and, based on obtaining an input indicating that the input offloading module is used, control the game driving module to generate the input offloading module.

7. The electronic device of claim 1, wherein at least one processor, individually and/or collectively, is configured to determine that the game is started based on game stream data received from the game server including a combination of a series of characteristic frames indicating the start of the game play.

8. A method for providing a game function in an electronic device, the method comprising:
  based on obtaining an event for selecting a game application, executing a game driving module;
  transferring game authentication information requesting a credential to a game server, by the game driving module;
  based on recognizing that a game corresponding to the event starts, generating an input offloading module, by the game driving module;
  providing delegation information to the input offloading module, by the game driving module; and
  transferring an input to the game server using the delegation information, by the input offloading module.

9. The method of claim 8, wherein the input includes at least one of a game play command and a game configuration-related command,
  wherein the delegation information includes device information about an input device where the input is input and server information about the game server,
  wherein the device information includes at least one of device-specific identification information, manufacturer, product information, MAC address, or memory address information about the input device, and
  wherein the memory address indicates a location where the user input is stored in the memory.

10. The method of claim 8, further comprising, based on the input offloading module receiving a second input, transferring, by the input offloading module, the second input to the game server regardless of whether game stream data corresponding to a first input transmitted to the game server is received.

11. The method of claim 8, further comprising, based on the input offloading module receiving a second input, transferring, by the input offloading module, the second input to the game server regardless of whether an operation of outputting, through a display unit and/or an audio output unit, game stream data corresponding to a first input transmitted to the game server is completed.

12. The method of claim 8, wherein the input offloading module operates in a kernel space.

13. The method of claim 8, further comprising outputting, by the game driving module, on a screen, whether the input offloading module is available and/or used based on at least one of a specification or resource state of the electronic device.

14. The method of claim 13, further comprising:
  suggesting, by the game driving module, whether to use the input offloading module and, based on obtaining an input indicating that the input offloading module is not used, transferring, by the game driving module, the input to the game server; and
  suggesting, by the game driving module, whether the input offloading module is used and, based on obtaining an input indicating that the input offloading module is used, generating, by the game driving module, the input offloading module.

15. The method of claim 8, further comprising determining that the game is started based on game stream data received from the game server including a combination of a series of characteristic frames indicating the start of the game play.

16. An electronic device, comprising:
  a communication unit comprising communication circuitry configured to transmit/receive data to/from a server or an input device comprising input circuitry;
  memory storing at least one program; and
  at least one processor, comprising processing circuitry, operatively connected with the memory, and/or the communication unit and individually and/or collectively configured to execute at least one instruction of the program stored in the memory,
  wherein at least one processor includes a driving process configured to execute an application and an input offloading process configured to process input from the input device in response to execution of the application,
  wherein at least one processor, individually and/or collectively, is configured to:
    obtain, by the driving processor, connection information with the input device and authentication information with the server;
    transmit, by the driving processor, the connection information and the authentication information to the input offloading process;
    receive, by the input offloading process, input data from the input device based on the connection information; and
    transmit, by the input offloading process, the input data to the server based on the authentication information.

17. The electronic device of claim 16, wherein at least one processor, individually and/or collectively, is configured to:
  until processing of input data is offloaded to the input offloading process, receive the input data from the input device based on the connection information by the driving processor, and transmit the input data to the server based on the authentication information by the driving processor.

18. The electronic device of claim 16, wherein at least one processor, individually and/or collectively, is configured to:
  in response to obtaining an event for selecting the application, execute the driving process; and
  in response to execution of the application, execute the input offloading process.

19. The electronic device of claim 16, wherein the input offloading process is configured to operate in a kernel space.

20. The electronic device of claim 16, wherein at least one processor, individually and/or collectively, is configured to:

control the driving process to output, on a screen, whether the input offloading process is available and/or used considering at least one of a specification or resource state of the electronic device;

control the driving process to suggest whether to use the input offloading process and, based on obtaining an input indicating that the input offloading process is not being used, control the driving process to transfer the input to the server; and control the driving process to suggest whether the input offloading process is used and, based on obtaining an input indicating that the input offloading process is used, control the driving process to execute the input offloading process.

\* \* \* \* \*